(12) United States Patent
Kim et al.

(10) Patent No.: US 11,076,101 B2
(45) Date of Patent: Jul. 27, 2021

(54) METHOD, APPARATUS, AND COMPUTER PROGRAM FOR CORRECTING OPTICAL AXIS OF ZOOM LENS

(71) Applicant: Hanwha Techwin Co., Ltd., Seongnam-si (KR)

(72) Inventors: Cheol Ho Kim, Seongnam-si (KR); Dae Bong Kim, Seongnam-si (KR); Young Sang Kwon, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/956,606

(22) PCT Filed: Jan. 8, 2018

(86) PCT No.: PCT/KR2018/000319
§ 371 (c)(1),
(2) Date: Jun. 21, 2020

(87) PCT Pub. No.: WO2019/124622
PCT Pub. Date: Jun. 27, 2019

(65) Prior Publication Data
US 2020/0396386 A1    Dec. 17, 2020

(30) Foreign Application Priority Data
Dec. 21, 2017    (KR) .................. 10-2017-0177488

(51) Int. Cl.
*H04N 5/232*    (2006.01)

(52) U.S. Cl.
CPC ..... *H04N 5/23296* (2013.01); *H04N 5/23222* (2013.01); *H04N 5/23232* (2013.01)

(58) Field of Classification Search
CPC .......... H04N 5/23296; H04N 5/23222; H04N 5/23232; H04N 5/23229; G02B 7/00; G02B 7/02; G03B 5/02
(Continued)

(56) References Cited

U.S. PATENT DOCUMENTS 3,935,381 A  *  1/1976  Petrocelli ............... H04N 3/223
                                                    348/240.99
8,872,944 B2 * 10/2014  Huang .................. H04N 5/23296
                                                    348/240.1
(Continued)

FOREIGN PATENT DOCUMENTS

JP    2011-1369296    7/2011
KR    10-0244566      11/1999
(Continued)

OTHER PUBLICATIONS

International Search Report dated Sep. 20, 2018 in PCT/KR2018/000319 (with English Translation).

*Primary Examiner* — Pritham D Prabhakher
(74) *Attorney, Agent, or Firm* — H.C. Park & Associates, PLC (57) ABSTRACT

A method of correcting an optical axis of a zoom lens includes obtaining a degree of optical axis misalignment corresponding to a current zoom lens state of a camera, considering the current zoom lens state of the camera and data previously stored to define a relationship between a state of the zoom lens of the camera and the degree of optical axis misalignment, determining digital zoom information to compensate for the degree of optical axis misalignment, considering the degree of optical axis misalignment, and generating correction image data by cropping and magnifying image data photographed by the camera to correspond to the digital zoom information.

17 Claims, 8 Drawing Sheets

(58) Field of Classification Search
USPC .................................................. 348/240.99
See application file for complete search history.

(56) References Cited

U.S. PATENT DOCUMENTS

| | | | | |
|---|---|---|---|---|
| 9,204,054 | B2* | 12/2015 | Aoki | H04N 5/23296 |
| 9,204,059 | B2* | 12/2015 | Watanabe | H04N 5/23248 |
| 9,420,187 | B2* | 8/2016 | Neufeld | H04N 5/23203 |
| 9,584,731 | B2* | 2/2017 | Neufeld | H04N 5/232 |
| 9,961,268 | B2* | 5/2018 | Kimura | H04N 5/232945 |
| 10,031,312 | B2* | 7/2018 | Gross | G02B 7/005 |
| 2008/0158394 | A1 | 7/2008 | Kim | |
| 2009/0135275 | A1* | 5/2009 | Imata | H04N 5/23203 |
| | | | | 348/240.99 |
| 2013/0155290 | A1* | 6/2013 | Huang | H04N 5/23296 |
| | | | | 348/240.1 |
| 2013/0162868 | A1* | 6/2013 | Watanabe | H04N 5/262 |
| | | | | 348/240.3 |
| 2014/0267834 | A1 | 9/2014 | Aoki | |
| 2014/0293111 | A1* | 10/2014 | Shintani | G03B 17/565 |
| | | | | 348/333.09 |
| 2015/0156422 | A1* | 6/2015 | Neufeld | H04N 5/23203 |
| | | | | 348/240.3 |
| 2016/0037096 | A1* | 2/2016 | Hatakeyama | H04N 5/23296 |
| | | | | 348/241 |
| 2016/0142639 | A1* | 5/2016 | Kimura | H04N 5/232945 |
| | | | | 348/240.3 |
| 2016/0330382 | A1* | 11/2016 | Neufeld | H04N 5/23296 |
| 2018/0048793 | A1* | 2/2018 | Gross | H04N 5/23238 |

FOREIGN PATENT DOCUMENTS

| | | |
|---|---|---|
| KR | 10-2003-0019957 | 3/2003 |
| KR | 10-2013-0077414 | 7/2013 |
| KR | 10-2013-0104772 | 9/2013 |
| KR | 10-1341632 | 12/2013 |
| KR | 10-2015-0129996 | 11/2015 |

* cited by examiner

METHOD, APPARATUS, AND COMPUTER PROGRAM FOR CORRECTING OPTICAL AXIS OF ZOOM LENS

TECHNICAL FIELD

The disclosure relates to a method and apparatus for correcting an optical axis of a zoom lens, and a computer program therefor.

BACKGROUND ART

A zoom lens, which is a mechanical set of lenses, provides an optical zoom function of changing a focal length according to movements of lenses. When an optical zoom is used, however, an optical axis misalignment effect may occur in which the center of an image is not maintained but misaligned according to a zoom magnification ratio.

As the demand for a high magnification ratio zoom lens has recently increased, the number of lens units used in a zoom lens is gradually increasing. As the number of lens units increases, a degree of optical axis misalignment becomes severe. To address this matter, it is necessary to assemble lens units more carefully, but no matter how carefully lens units are assembled, a complete optical axis adjustment is practically impossible due to a physical limitation of different allowances of internal components of a zoom lens. Also, in a case when an entire set of lens units is carefully used, productivity considerably deteriorates instead.

DESCRIPTION OF EMBODIMENTS

Technical Problem

Embodiments of the disclosure provide, in view of software, a method and apparatus for correcting an optical axis of a zoom lens, and a computer program therefor. The technical objectives to be achieved by the disclosure are not limited to the above-described objectives, and other technical objectives may be inferred from the following embodiments

Solution to Problem

In one embodiment of the disclosure, a method of correcting an optical axis of a zoom lens includes obtaining a degree of optical axis misalignment corresponding to a current zoom lens state of a camera, considering the current zoom lens state of the camera and data previously stored to define a relationship between a state of the zoom lens of the camera and the degree of optical axis misalignment, determining digital zoom information to compensate for the degree of optical axis misalignment, considering the degree of optical axis misalignment, and generating correction image data by cropping and magnifying image data photographed by the camera to correspond to the digital zoom information In one embodiment, the obtaining of the degree of optical axis misalignment may include obtaining the degree of optical axis misalignment corresponding to the current zoom lens state by referring to the previously stored data, the digital zoom information may include a digital zoom magnification ratio and crop information, the determining of the digital zoom information may include determining the digital zoom magnification ratio and the crop information, considering the degree of optical axis misalignment, and the generating of the correction image data may include generating the correction image data by zooming the image data by the digital zoom magnification ratio and cropping the image data to correspond to the crop information In one embodiment, the previously stored data may include a look-up table including a plurality of indexes including a zoom lens state and a degree of optical axis misalignment matching the zoom lens state, and the determining of the digital zoom information may include determining the digital zoom information on the basis of the degree of optical axis misalignment included in an index corresponding to the current zoom lens state of the indexes included in the look-up table.

In one embodiment, the determining of the digital zoom information may include, when the look-up table does not include an index corresponding to the current zoom lens state, obtaining the degree of optical axis misalignment corresponding to the current zoom lens state on the basis of interpolation of data included in the indexed included in the look-up table.

In one embodiment, the determining of the digital zoom information may include determining the digital zoom information further considering a resolution of a frame of the image data.

In one embodiment, the resolution may include a first axis component and a second axis component that is different from the first axis, the degree of optical axis misalignment may include the first axis component and the second axis component, and the determining of the digital zoom information may include determining the digital zoom information, considering the first axis component and the second axis component of the degree of optical axis misalignment and the first axis component and the second axis component of the resolution.

In one embodiment, the determining of the digital zoom information may include determining the digital zoom information on the basis of a greater value between the degree of optical axis misalignment relative to the resolution with respect to the first axis and the degree of optical axis misalignment relative to the resolution with respect to the second axis.

In one embodiment, the digital zoom information may include a digital zoom magnification ratio and crop information, and the determining of the digital zoom information may include determining the digital zoom magnification ratio on the basis of the greater value and the crop information on the basis of the digital zoom magnification ratio and the degree of optical axis misalignment.

In one embodiment, the determining of the digital zoom information may include determining the digital zoom information on the basis of a value calculated by using an Equation below, $$\text{Max}\left(\frac{R_1}{R_1 - |P_1| \times 2}, \frac{R_2}{R_2 - |P_2| \times 2}\right)$$

wherein "$R_1$" denotes the resolution of the first axis component, "$P_1$" denotes the degree of optical axis misalignment of the first axis component, "$R_2$" denotes the resolution of the second axis component, and "$P_2$" denotes the degree of optical axis misalignment of the second axis component.

In one embodiment, the digital zoom information may include a digital zoom magnification ratio and crop information, the generating of the correction image data may include generating the correction image data by cropping the image data according to the crop information and magnifying cropped image data by the digital zoom magnification ratio, and a frame size of the correction image data may be the same as a frame size of the image data.

In one embodiment, the obtaining of the degree of optical axis misalignment may include further obtaining a fixed digital zoom magnification ratio that is determined considering a maximum value of the degree of optical axis misalignment included in the previously stored data, the determining of the digital zoom information may include determining crop information of the image data, considering the fixed digital zoom magnification ratio and the obtained degree of optical axis misalignment, and the generating of the correction image data may include generating the correction image data by cropping the image data according to the crop information and magnifying cropped image data by the fixed digital zoom magnification ratio.

In one embodiment, the determining of the digital zoom information may include determining the crop information further considering a size of a frame of the image data.

In one embodiment, the crop information may include a location and a size of a crop area, and the determining of the digital zoom information may include determining the location of the crop area considering the size of the frame, the fixed digital zoom magnification ratio, and the degree of optical axis misalignment, and determining the size of the crop area considering the size of the frame and the fixed digital zoom magnification ratio.

In one embodiment, the location of a crop area may be expressed by a crop start location including a first axis component that is determined from a value calculated by Equation 1 below and a second axis component that is determined from a value calculated by Equation 2 below, $$\frac{R_1\left(1-\frac{1}{Z}\right)}{2} + P_1 \quad \text{(Equation 1)}$$

$$\frac{R_2\left(1-\frac{1}{Z}\right)}{2} + P_2 \quad \text{(Equation 2)}$$

wherein "$R_1$" denotes the resolution of the first axis component, "$P_1$" denotes the degree of optical axis misalignment of the first axis component, "$R_2$" denotes the resolution of the second axis component, "$P_2$" denotes the degree of optical axis misalignment of the second axis component, and "Z" denotes the fixed digital zoom magnification ratio.

In one embodiment, the method further include checking whether the camera is in a real-time monitoring mode, wherein, when the camera is in a real-time monitoring mode, the method may further include correcting the image data photographed by the camera in real time according to a fixed digital zoom magnification ratio that is determined considering a maximum value of the degree of optical axis misalignment included in the previously stored data, and outputting the correction image data to a display apparatus in real time, and when the real-time monitoring mode is completed, the method may further include generating the correction image data by cropping and magnifying the image data at each frame considering the degree of optical axis misalignment of the image data at each frame, by repeatedly performing the obtaining of the degree of optical axis misalignment, the determining of the digital zoom information, and the generating of the correction image data on each of a plurality of frames of the image data photographed by the camera.

In another embodiment of the disclosure, an apparatus for correcting an optical axis of a zoom lens includes a correction data generation unit configured to obtain a degree of optical axis misalignment corresponding to a current zoom lens state of a camera, considering the current zoom lens state of the camera and data previously stored to define a relationship between a state of the zoom lens of the camera and the degree of optical axis misalignment, and determine digital zoom information to compensate for the degree of optical axis misalignment, considering the degree of optical axis misalignment corresponding to a current zoom lens state of the camera, and an image data output unit configured to generate correction image data by cropping and magnifying image data photographed by the camera to correspond to the digital zoom information.

In another embodiment of the disclosure, a computer program is stored in a medium to perform the above method by using a computer.

Other implementations, features, or advantages in addition to the above descriptions may be clarified by the drawings, claims, and the detailed description of the disclosure. The general and detailed implementation may be performed by using a combination of a system, a method, a computer program, or any system, a method, a computer program.

Advantageous Effects of Disclosure

In a method and apparatus for correcting an optical axis of a zoom lens, and a computer program therefor, according to an embodiment of the disclosure, in view of software, as a misalignment of an optical axis of a zoom lens is compensated for, a point that a complete optical axis alignment is impossible in terms of hardware may be complemented.

BEST MODE

As the disclosure allows for various changes and numerous embodiments, embodiments will be illustrated in the drawings and described in detail in the written description. Advantages and features of the disclosure and methods of accomplishing the same may be understood more readily by reference to the following detailed description of exemplary embodiments and the accompanying drawings. The disclosure may, however, be embodied in many different forms and should not be construed as being limited to the embodiments set forth herein.

Hereinafter, the embodiments of the disclosure are described in detail with reference to the accompanying drawings, and like reference numerals in the drawings denote like elements, and thus their description will be omitted While such terms as "first," "second," etc., may be used to describe various components, such components must not be limited to the above terms. The above terms are used only to distinguish one component from another.

In the embodiments below, an expression used in a singular form in the specification also includes the expression in its plural form unless clearly specified otherwise in context.

Also, in the embodiments below, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In the drawings, the sizes of constituent elements are exaggerated for convenience of explanation. For example, as the sizes and thicknesses of components in the drawings are arbitrarily illustrated for convenience of explanation, the following embodiments are not limited thereto.

Figure 1:
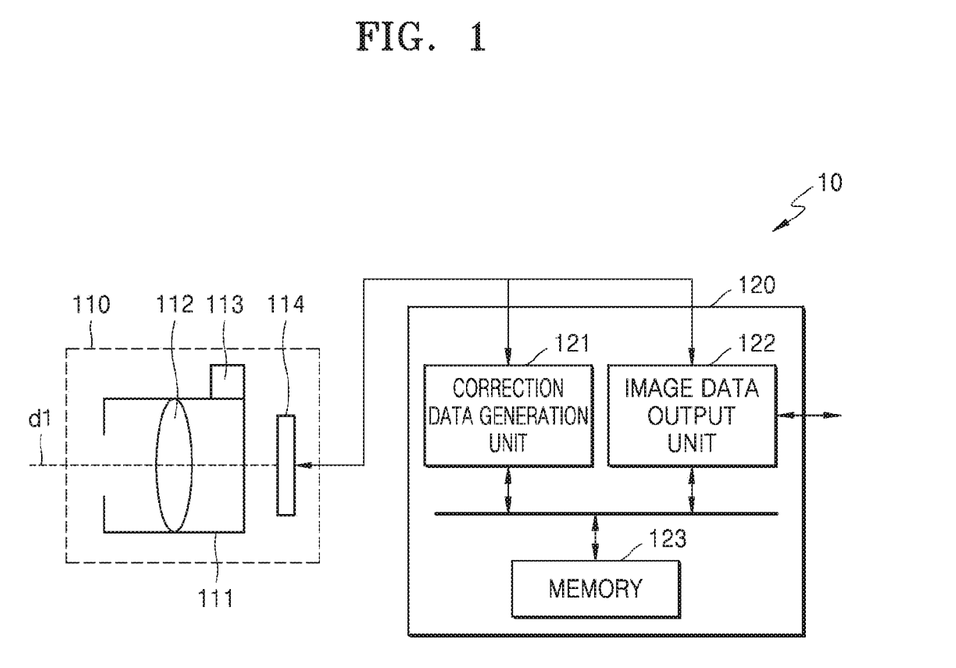
FIG. 1 schematically illustrates a camera system according to an embodiment of the disclosure.

FIG. 1 schematically illustrates a camera system according to an embodiment of the disclosure.

Referring to FIG. 1, a camera system 10 may include a camera 110 and a control device 120. The camera 110 and the control device 120 may be mechanically connected to each other and housed in the same case or may be provided as separate devices.

The camera 110 may include a barrel 111, a zoom lens 112 moving inside the barrel 111, a driving unit 113 for driving the zoom lens 112, and an image sensor 114 for converting light passing through the zoom lens 112 to electrical signals and outputting the electrical signals.

Although FIG. 1 illustrates that the zoom lens 112 includes one lens, the zoom lens 112 may be interpreted as a lens group including a plurality of lenses aligned along an optical axis. As the zoom lens 112 includes more lenses, an optical axis misalignment effect becomes further severe. No matter how carefully considering an optical axis alignment when the zoom lens 112 is mounted, it may be stated that a complete optical axis correction may be practically impossible.

The control device 120 according to an embodiment of the disclosure may correct an optical axis misalignment effect in view of software. The control device 120 according to an embodiment may compensate for optical axis misalignment by applying a digital zoom (D-zoom) to image data photographed by the camera 110. In detail, the optical axis misalignment in image data may be compensated for by cropping a partial area of the image data and magnifying the cropped area. In general, as an amount of optical axis misalignment is not much, the optical axis misalignment may be compensated for with a fine D-zoom only.

The control device 120 according to an embodiment may correct image data in the form of raw data and then encode and output the image data, or may encode image data and then correct and output the image data. Format conversion of the image data may be performed in an appropriate operation according to the necessity of the control device 120.

A D-zoom magnification ratio according to an embodiment may be a magnification ratio that allows minimum zooming to compensate for optical axis misalignment.

The control device 120 is illustrated to have only constituent elements related to the present embodiment to prevent the characteristics of the present invention from being unclear. Accordingly, it is obvious to one skilled in the art to which the present embodiment is related that other general-purposed constituent elements may be further included in addition to the constituent elements illustrated in FIG. 1.

The control device 120 may include a correction data generation unit 121 for generating corrected data to compensate for a degree of optical axis misalignment in image data, from the image data output from the camera 110, an image data output unit 122 for generating and outputting corrected image data by using the corrected data generated by the correction data generation unit 121, and a memory 123 for storing data.

The correction data generation unit 121, the image data output unit 122, and the memory 123 may transceive data with one another.

The correction data generation unit 121 and the image data output unit 122 may correspond to at least one processor, may include at least one processor, and may be included in one integrated processor. The control device 120 may be driven by being included in another hardware apparatus such as a microprocessor or general-purpose computer system.

Although not illustrated in FIG. 1, the camera system 10 may further include a display unit (not shown) for obtaining the correction image data output from the control device 120 and displaying the correction image data on a screen. The display unit may display in real time image data that is photographed by the camera 110 and in which optical axis misalignment is compensated for by the control device 120. Accordingly, a photographing state of the camera 110 may be monitored in real time.

The disclosure may include functional block components and various processing operations. The functional blocks may be implemented by various numbers of hardware or/and software components that perform specific functions. For example, the disclosure may employ direct circuit components such as a memory, processing, logic, a look-up table, which may perform various functions under the control of one or more microprocessors or by other control units. Similar to the constituent elements of the disclosure that are executed by software programming or software components, the disclosure may include various algorithms implemented by a combination of data structures, processes, routines, or other programming components, and may be embodied by a programming or scripting languages such as C, C++, Java, assembler, etc. Functional aspects may be implemented by an algorithm executed in one or more processors. Furthermore, the disclosure may employ prior art for electronic environment configuration, signal processing, and/or data processing. Terms "mechanism", "component", "means", "configuration" may be used in a wide sense, and are not limited to mechanical and physical components. The terms are in association with a processor and may include a meaning of a series of routines of software.

Figure 2:
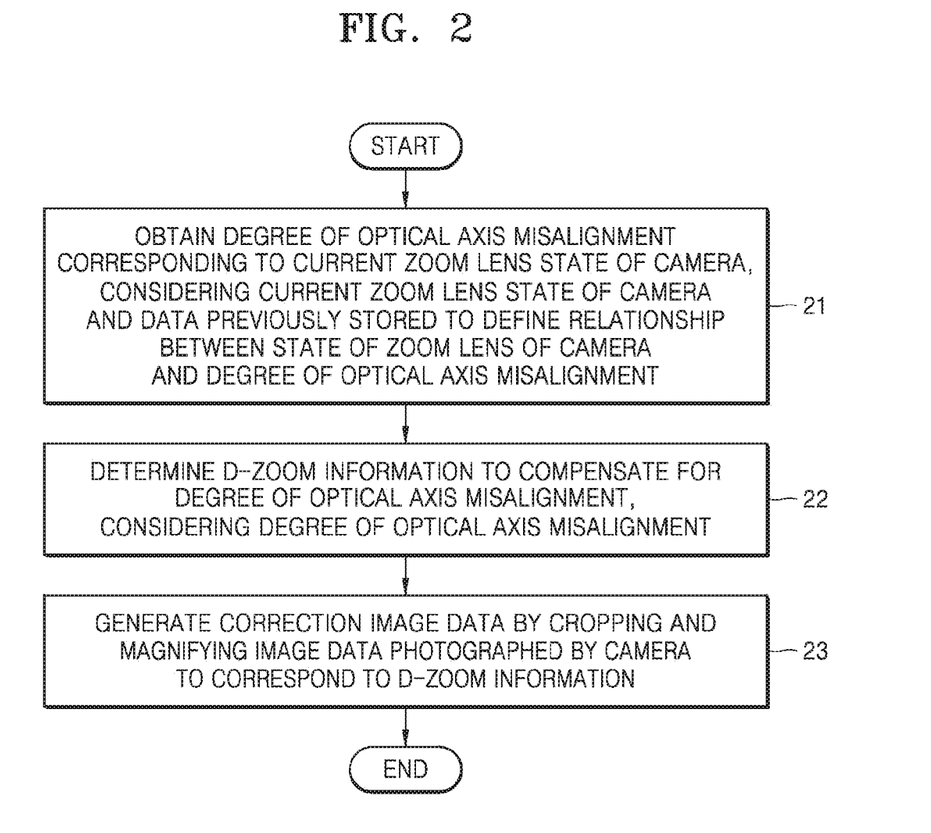
FIG. 2 is a flowchart of an optical axis correction method according to an embodiment of the disclosure.

FIG. 2 is a flowchart of an optical axis correction method according to an embodiment of the disclosure.

The flowchart of FIG. 2 includes the camera system 10 illustrated in FIG. 1, in detail, time-serial operations performed by the control device 120, in the following description, embodiments of the disclosure are described with reference to FIGS. 1 and 2 together.

In operation 21, the correction data generation unit 121 obtains a current degree of optical axis misalignment of the image data photographed by the camera, considering a current zoom lens state of the camera and data previously stored to define a relationship between the state of the zoom lens 112 of the camera 110 and a degree of optical axis misalignment.

The correction data generation unit 121 may obtain, from the driving unit 113, an electrical signal indicating information about a current state of the zoom lens 112. The previously stored data may be read out from the memory 123. The previously stored data may be data, as data corresponding to the camera 110, provided through a test of measuring a degree of optical axis misalignment for each zoom magnification ratio after the camera 110 is assembled, but the disclosure is not limited thereto.

In operation 22, the correction data generation unit 121 determines D-zoom information of image data to compensate for a degree of optical axis misalignment, considering the current degree of optical axis misalignment obtained in operation 21. In operation 22, the determined D-zoom information may include a D-zoom magnification ratio and crop information.

In operation 23, the image data output unit 122 generates correction image data by cropping and magnifying image data to correspond to the D-zoom information determined in operation 22. In operation 23, the image data output unit 122 may generate correction image data having the same frame size as that of the existing image data by cropping image data according to the crop information determined in operation 22 and magnifying the cropped image as much as the D-zoom magnification ratio determined in operation 22. In other words, the frame size of correction image data may be the same as that of the image data. In this state, cropping image data may signify trimming a partial area of the image data.

<Method of Obtaining a Degree of Optical Axis Misalignment>

According to an embodiment, in operation 21, the correction data generation unit 121 may obtain a current degree of optical axis misalignment corresponding to a current zoom lens state by referring to the previously stored data.

In detail, the previously stored data may include a look-up table including a plurality of indexes, and each index may include a zoom lens state and a degree of optical axis misalignment matching the zoom lens state. The correction data generation unit 121 may search for an index having a zoom lens state value corresponding to a current zoom lens state from the indexes included in the look-up table, and determine D-zoom information on the basis of a degree of optical axis misalignment value included in the index.

When the previously stored data, for example, a look-up table, does not include an index corresponding to the current zoom lens state of the camera 110, the correction data generation unit 121 may obtain a degree of optical axis misalignment corresponding to the current zoom lens state on the basis of interpolation of data values included in the indexes included in the look-up table.

For example, when the current zoom lens state of the camera 110 is a value between a zoom lens state value of a first index and a zoom lens state value of a second index, the correction data generation unit 121 may interpolate a value of a degree of optical axis misalignment of the first index and a value of a degree of optical axis misalignment of the second index and thus obtain a current degree of optical axis misalignment corresponding to the current zoom lens state of the camera 110.

The correction data generation unit 121 may obtain a current degree of optical axis misalignment by a linear interpolation method according to, for example, Equation 1 below.

$$b_x = b_1 + \frac{b_2 - b_1}{a_2 - a_1}(a_x - a_1) \qquad \text{[Equation 1]}$$

Here, "$b_x$" may denote a current degree of optical axis misalignment to be sought for, "$a_1$" may denote a zoom lens state of the first index, "$b_1$" may denote a degree of optical axis misalignment of the first index, "$a_2$" may denote a zoom lens state of the second index, "$b_2$" may denote a degree of optical axis misalignment of the second index, and "$a_x$" may denote a current zoom lens state of the camera 110.

The correction data generation unit 121 may use various interpolation methods in addition to the linear interpolation method.

The disclosure may include, in relation to a detailed obtaining method of a D-zoom magnification ratio, a first embodiment in which accuracy of correction is improved by using a variable D-zoom magnification ratio that deliberately reflects a current degree of optical axis misalignment of the camera 110, and a second embodiment in which a processing speed is increased by using a D-zoom magnification ratio as one fixed value determined considering all available degrees of optical axis misalignment that may be occurred in the camera 110.

However, aside from that a method of calculating a D-zoom magnification ratio may be divided as described above, the correction data generation unit 121 may generate crop information to deliberately reflect a current degree of optical axis misalignment of the camera 110.

In the following description, for convenience of explanation, the embodiments of the disclosure are described in detail on the basis of the first embodiment, and then features of the second embodiment that are different from the first embodiment are additionally described. Accordingly, descriptions presented on the basis of the first embodiment and also identically applicable to the second embodiment may be omitted in the description of the second embodiment. In the following description, all descriptions of the detailed embodiments of the disclosure described on the basis of the first embodiment may be identically applied to the second embodiment, except a detailed method of determining a D-zoom magnification ratio according to current optical axis misalignment information.

First Embodiment

According to an embodiment, in operation 22, the correction data generation unit 121 may determine a D-zoom magnification ratio and crop information, considering a current degree of optical axis misalignment obtained in operation 21.

In operation 23, the image data output unit 122 may magnify image data as much as a D-zoom magnification ratio determined in operation 22 according to the current degree of optical axis misalignment, cropping the image data corresponding to crop information determined in operation 22 according to the current degree of optical axis misalignment.

According to an embodiment, in operation 22, the correction data generation unit 121 may further consider a frame resolution of image data to determine the D-zoom information. The correction data generation unit 121 may determine a D-zoom magnification ratio considering a degree of optical axis misalignment relative to a frame resolution.

The correction data generation unit 121 may obtain a resolution by obtaining resolution information from the image data, reading out a resolution value of the image data photographed by the camera 110 from the memory 123, or reading out a current resolution configuration value of the camera 110 from the memory 123.

A frame resolution value may include a first axis component and a second axis component. For example, the frame resolution value may include a resolution value of each of an x-axis component and a y-axis component.

In one embodiment of the disclosure, the degree of optical axis misalignment may also include the first axis component and the second axis component. In other words, the degree of optical axis misalignment may include a degree of misalignment in a first axis direction and a degree of misalignment in a second axis direction.

In one embodiment, the correction data generation unit 121 may determine D-zoom information considering both of the first axis component and the second axis component of a degree of optical axis misalignment and the first axis component and the second axis component of a frame resolution.

The correction data generation unit 121 may determine only one zoom magnification ratio, even when relative degrees of optical axis misalignment in the first axis and the second axis are different from each other, so that the first axis and the second axis may be zoomed at the same magnification ratio according to one zoom magnification ratio. To this end, the correction data generation unit 121 may determine D-zoom information on the basis of a greater value between the degree of optical axis misalignment relative to a resolution with respect to the first axis and the degree of optical axis misalignment relative to a resolution with respect to the second axis.

For example, even when optical axis misalignment occurs in the first axis only and no optical axis misalignment occurs in the second axis, the correction data generation unit 121 may determine a D-zoom magnification ratio according to the degree of optical axis misalignment in the first axis, and the image data output unit 122 may zoom the first axis and the second axis at the same magnification ratio according to the determined D-zoom magnification ratio. Accordingly, an aspect ratio of an image may be maintained.

According to an embodiment, the correction data generation unit 121 may determine a D-zoom magnification ratio on the basis of a value calculated by using Equation 2 below.

$$\text{Max}\left(\frac{R_1}{R_1 - |P_1| \times 2}, \frac{R_2}{R_2 - |P_2| \times 2}\right) \qquad \text{[Equation 2]}$$

Here, "$R_1$" may denote a resolution of the first axis component, "$P_1$" may denote a degree of optical axis misalignment of the first axis component, "$R_2$" may denote a resolution of the second axis component, and "$P_2$" may denote a degree of optical axis misalignment of the second axis component. In Equation 2, the units of "$R_1$", "$R_2$", "$P_1$", and "$P_2$" may correspond to the number of pixels. A function of Max (A, B) may signify a function taking a greater value between A and B.

Referring to Equation 2, as a degree of optical axis misalignment may be a negative number, the correction data generation unit 121 may calculate a D-zoom magnification ratio by taking the absolute value of a degree of optical axis misalignment value.

For example, when an optical axis is misaligned by one pixel to the left, the optical axis may be located at the center of a cut area by cutting an area from an entire frame as much as two pixels to the right, thereby compensating for the optical axis misalignment. Accordingly, the correction data generation unit 121 may determine a D-zoom magnification ratio from a size of the original frame and a ratio value obtained by subtracting twice of an amount of optical axis misalignment from the size of the original frame.

The correction data generation unit 121 may determine a D-zoom magnification ratio by using Equation 2 as above to allow cutting off as much as at least twice the amount of optical axis misalignment on each of the first axis and the second axis.

According to an embodiment, the correction data generation unit 121 may determine crop information on the basis of a current degree of optical axis misalignment and the D-zoom magnification ratio determined by the above-described method.

The correction data generation unit 121 may calculate a size of a crop area in units of pixel numbers on the basis of the D-zoom magnification ratio and determine a location of the crop area on the basis of the size of the crop area and a current degree of optical axis misalignment.

The location of a crop area may be represented by one or more point coordinates that may specify the location of a crop area. For example, the location of a crop area may be expressed by one point where crop starts, or by the location of a crop start point below. The image data output unit 122 may crop an image as much as the size of a crop area determined by the correction data generation unit 121 from the crop start point determined by the correction data generation unit 121.

The correction data generation unit 121 may determine coordinates of the location of a crop start point on the basis of a value calculated by using Equation 3 below.

$$C(x, y) = \left(\frac{R_1 - R'_1}{2} + P_1, \frac{R_2 - R'_2}{2} + P_2\right) \qquad \text{[Equation 3]}$$

Here, "$C(x,y)$" may denote coordinates of a location of a crop start point, "$R_1$" may denote a resolution of the first axis component, "$R'_1$" may denote a size of a crop area of the first axis component, "$P_1$" may denote a degree of optical axis misalignment of the first axis component, "$R_2$" may denote a resolution of the second axis component, "$R'_2$" may denote a size of a crop area of the second axis component, and "$P_2$" may denote a degree of optical axis misalignment of the second axis component. The unit of each of variables may correspond to the number of pixels.

The size of a crop area may be calculated by using Equation 4 below.

$$(R'_1, R'_2) = \left(\frac{R_1}{Z}, \frac{R_2}{Z}\right) \qquad \text{[Equation 4]}$$

Here, "Z" may be a D-zoom magnification ratio. Regardless of whether Z is a fixed value or a value variably determined according to the current degree of optical axis misalignment, Equation 4 may be used to determine the size of a crop area.

By combining Equation 3 and Equation 4, Equation 5 and Equation 6 below may be produced. The correction data generation unit 121 may determine a first axis component of a crop start position from the value calculated by Equation 5.

$$\frac{R_1\left(1-\frac{1}{Z}\right)}{2} + P_1 \qquad \text{[Equation 5]}$$

The correction data generation unit 121 may determine a second axis component of a crop start location from the value calculated by Equation 6.

$$\frac{R_2\left(1-\frac{1}{Z}\right)}{2} + P_2 \qquad \text{[Equation 6]}$$

Regardless of whether Z is a fixed value or a value variably determined according to the current degree of optical axis misalignment, Equation 5 and Equation 6 may be used to determine the location of a crop area.

Second Embodiment

Figure 3:
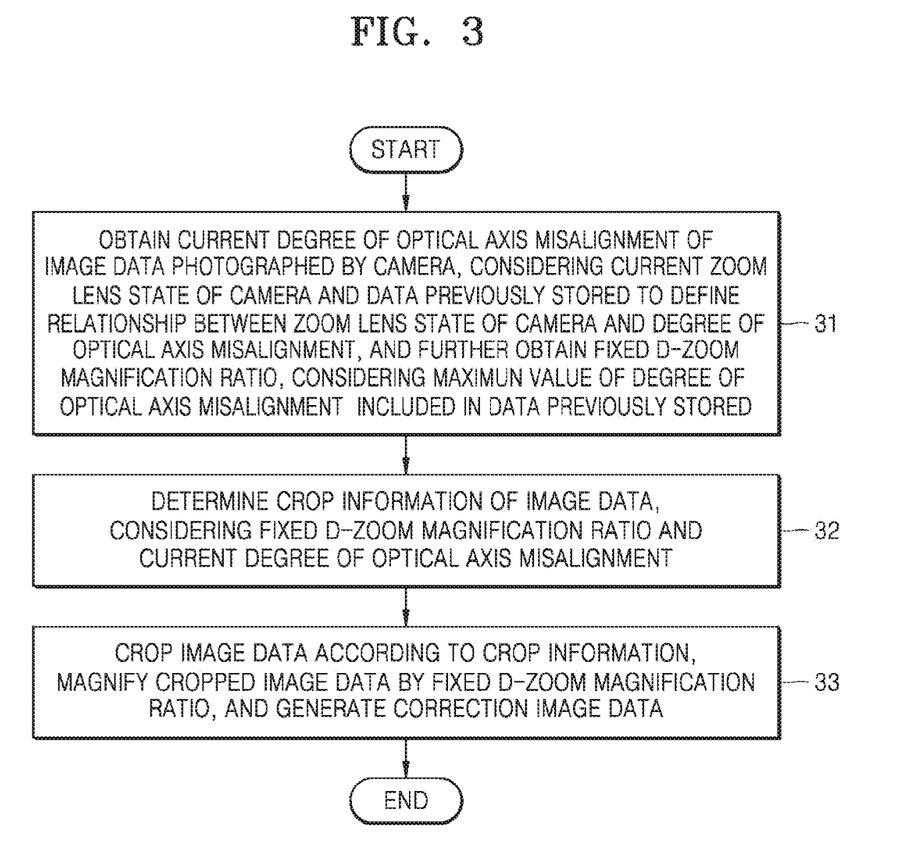
FIG. 3 is a flowchart of an optical axis correction method according to another embodiment of the disclosure.

FIG. 3 is a flowchart of an optical axis correction method according to another embodiment of the disclosure.

The flowchart of FIG. 3 shows a method of correcting optical axis misalignment by using a fixed D-zoom magnification ratio when a D-zoom magnification ratio is used as a fixed value to reduce a computational throughput according to a second embodiment of the disclosure.

However, the above-described second embodiment, which corresponds to a modification of the first embodiment by partially modifying the method of determining a D-zoom magnification ratio in the first embodiment, may be interpreted such that various features of the disclosure described above in relation to the first embodiment may be applied to the second embodiment.

Accordingly, all descriptions presented above with reference to FIG. 2 may be identically applied to the embodiment regarding the flowchart of FIG. 3, except a description about the determination of a D-zoom magnification ratio on the basis of a current degree of optical axis misalignment.

Referring to FIG. 3, in operation 31, the correction data generation unit 121 may obtain a current degree of optical axis misalignment of image data photographed by the camera 110 and further obtain a fixed D-zoom magnification ratio, considering the current zoom lens state of the camera 110 and data previously stored to define a relationship between the zoom lens state of the camera 110 and a degree of optical axis misalignment.

The fixed D-zoom magnification ratio may be determined considering the maximum value of a degree of optical axis misalignment included in the previously stored data. The fixed D-zoom magnification ratio may be previously determined considering the maximum value of a degree of optical axis misalignment included in the previously stored data, and stored in the memory 123. The correction data generation unit 121 may read out the fixed D-zoom magnification ratio stored in the memory 123. However, the disclosure is not limited thereto, and the correction data generation unit 121 may calculate the fixed D-zoom magnification ratio considering the maximum value of a degree of optical axis misalignment included in the previously stored data, by referring to the previously stored data that is stored in the memory 123.

In operation 32, the correction data generation unit 121 may determine crop information of image data, considering the fixed D-zoom magnification ratio and the current degree of optical axis misalignment obtained in operation 31. The crop information may include the location and size of a crop area.

The correction data generation unit 121 may determine crop information further considering the frame size of image data. The correction data generation unit 121 may determine the location of a crop area considering the frame size of image data, the fixed D-zoom magnification ratio, and the current degree of optical axis misalignment, and determine the size of a crop area considering the frame size of image data and the fixed D-zoom magnification ratio. For example, the correction data generation unit 121 may calculate the size of a crop area by dividing the frame size of image data by the fixed D-zoom magnification ratio.

In operation 33, the image data output unit 122 may crop the image data photographed by the camera 110 according to the crop information determined in operation 32, magnify the cropped image data by the fixed D-zoom magnification ratio obtained in operation 31, and output correction image data.

According to an embodiment, the fixed D-zoom magnification ratio may be calculated by Equation 7 below.

$$\text{Max}\left(\frac{R_1}{R_1 - |P_{max_1}| \times 2}, \frac{R_2}{R_2 - |P_{max_2}| \times 2}\right) \qquad \text{[Equation 7]}$$

Here, "$P_{max_1}$" may denote a maximum value of a degree of optical axis misalignment of the first axis component included in the indexes of the previously stored data, "$P_{max_2}$" may denote a maximum value of a degree of optical axis misalignment of the second axis component included in the indexes of the previously stored data. Furthermore, "$R_1$" may denote a resolution of the first axis component, "$R_2$" may denote a resolution of the second axis component, and the unit of each variable may correspond to the number of pixels.

MODE OF DISCLOSURE

Figure 4:
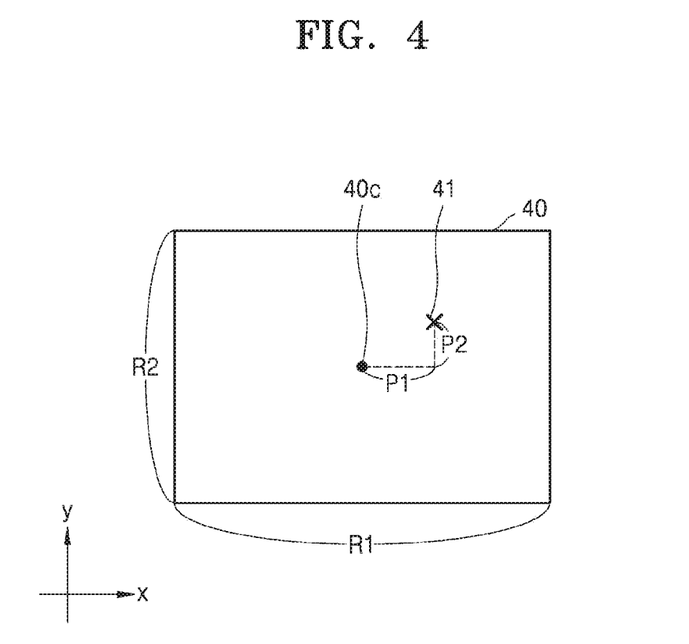
FIG. 4 illustrates an example of an image before correction.

FIG. 4 illustrates an example of an image before correction.

Referring to FIG. 4, an example of an image 40 captured when the zoom lens 112 of the camera 110 is in a first state is illustrated. Further, an object 41 located at a center in an optical axis direction dl of the camera 110 is illustrated. When a degree of optical axis misalignment is 0, the object 41 is located at a center 40c of the image 40. However, as a current optical axis is misaligned by P1 in an x-axis direction that is a first axis, and by P2 in a y-axis direction that is a second axis. As such, it may be seen that, due to the existence of a degree of optical axis misalignment, the object 41 that is located in an extension line of the optical axis direction dl is deviated from the center 40c in a frame of the image 40. The degree of optical axis misalignment of FIG. 4 is arbitrarily illustrated for convenience of explanation.

The control device 120 according to an embodiment may correct the image 40 so that the object 41 is located at the center 40c of the frame of the image 40.

The data for defining a relationship between a degree of optical axis misalignment and a state of a zoom lens corresponding to the camera 110 that captures the image 40 may be previously stored in the memory 123.

Figure 5:
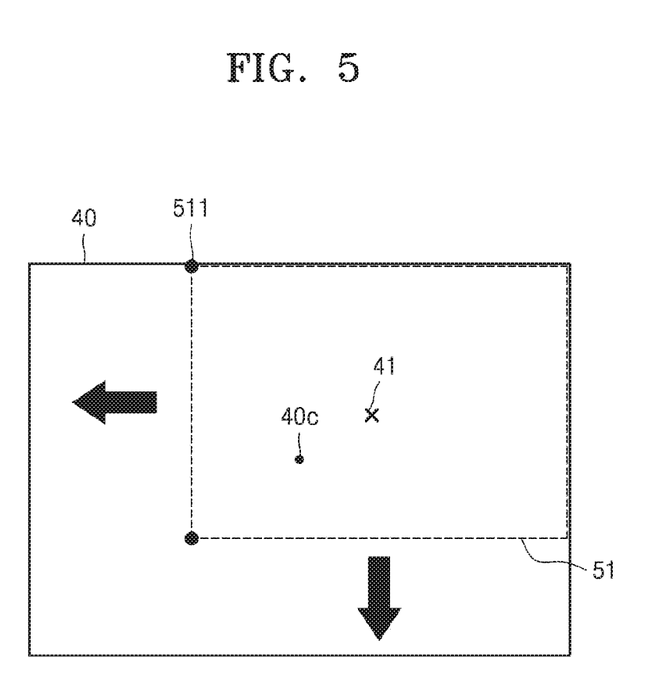
FIG. 5 illustrates an image crop according to an embodiment.

FIG. 5 illustrates an image crop according to an embodiment.

Referring to FIG. 5, the correction data generation unit 121 may determine information about the size and location of a crop area 51 in the image 40. The crop area 51 of FIG. 5 may be determined on the basis of the D-zoom magnification ratio that is determined considering a degree of optical axis misalignment in the image 40 according to the above-described first embodiment. As a result, the crop area 51 may be determined such that the object 41 is located at the center of the crop area 51.

The correction data generation unit 121 may determine a size of the crop area 51 by dividing the size of the image 40 by the D-zoom magnification ratio determined considering the degree of optical axis misalignment, and determine a location of a crop start point 511 considering the frame size of the image 40, the size of the crop area 51, and the degree of optical axis misalignment.

The image data output unit 122 may cut off, from the crop start point 511, the crop area 51 that is an area as large as the size of the crop area 51.

In the example of FIG. 5, according to the above-described first embodiment, the correction data generation unit 121 may determine crop information according to a minimum D-zoom magnification ratio to compensate for optical axis misalignment in the current image 40, and at least one edge of the crop area 51 may contact an edge of the image 40. For example, when a relative optical axis misalignment of the x-axis is greater than a relative optical axis misalignment of the y-axis, the correction data generation unit 121 may determine a minimum D-zoom magnification ratio on the basis of a relative optical axis misalignment of the x-axis according to the above-described Equation 2. Accordingly, as crop in the x-axis direction is minimized, the left or right edge of the crop area 51 may contact the left or right edge of the image 40 that is the original image.

In contrast, when the relative optical axis misalignment of the y-axis is greater than the relative optical axis misalignment of the x-axis, the correction data generation unit 121 may determine a minimum D-zoom magnification ratio on the basis of the relative optical axis misalignment of the y-axis according to the above-described Equation 2. Accordingly, as crop in the y-axis direction is minimized, the upper or lower end edge of the crop area 51 may contact an upper or lower end edge of the image 40 that is the original image.

Figure 6:
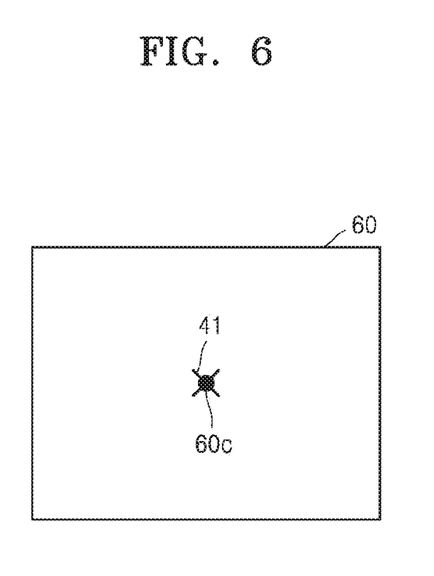
FIG. 6 illustrates an example of a corrected image.

FIG. 6 illustrates an example of a corrected image.

The image data output unit 122 may generate a correction image 60 of FIG. 6 by cutting off the crop area 51 of FIG. 5 and then magnifying the crop area 51 by a D-zoom magnification ratio. The correction image 60 may have the same size as the size of the image 40 of FIG. 5.

Referring to FIG. 6, as the object 41 is located at a center 60c of the correction image 60, it may be seen that the optical axis misalignment is compensated for.

Figure 7:
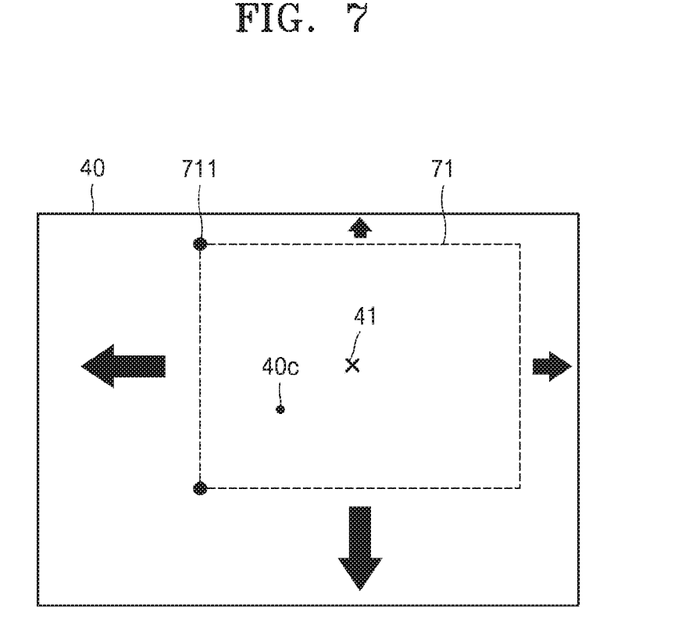
FIG. 7 illustrates another example of an image crop according to an embodiment.

FIG. 7 illustrates another example of an image crop according to an embodiment.

Referring to FIG. 7, the correction data generation unit 121 may determine information about the size and location of a crop area 71 in the image 40. The crop area 71 of FIG. 7 may be determined according to a fixed D-zoom magnification ratio based on the maximum degree of optical axis misalignment that may be occurred in the camera 110 according to the above-described second embodiment. As a result, the crop area 71 may be determined such that the object 41 is located at the center of the crop area 71.

The correction data generation unit 121 may determine the size of the crop area 71 by dividing the size of the image 40 by a fixed D-zoom magnification ratio, and determine the location of a crop start point 711 considering the frame size of the image 40, the size of the crop area 71, and a current degree of optical axis misalignment of the image 40.

The image data output unit 122 may cut off, from the crop start point 711, the crop area 71 that is an area as large as the size of the crop area 71.

In the example of FIG. 7, according to the above-described second embodiment, as the correction data generation unit 121 uses a fixed D-zoom magnification ratio determined according to the maximum degree of optical axis misalignment that may be occurred in the camera 110, not the optical axis misalignment in the current image 40, all edges of the crop area 71 may be spaced apart from the edge of the image 40 as illustrated in FIG. 7. However, when one axis component of a degree of optical axis misalignment in the current image 40 corresponds to the maximum degree of optical axis misalignment, some edges of the crop area 71 may contact the edge of the image 40.

As the degree of optical axis misalignment and a relative size of the crop area illustrated in FIGS. 4 to 7 are all exemplarily illustrated for convenience of explanation, the disclosure is not limited thereto. For example, although the illustrations of the degree of optical axis misalignment in FIGS. 4 to 7 are exaggerated, actually, the degree of optical axis misalignment is fine so that the size of a crop area may be almost similar to that of the original image.

Figure 8:
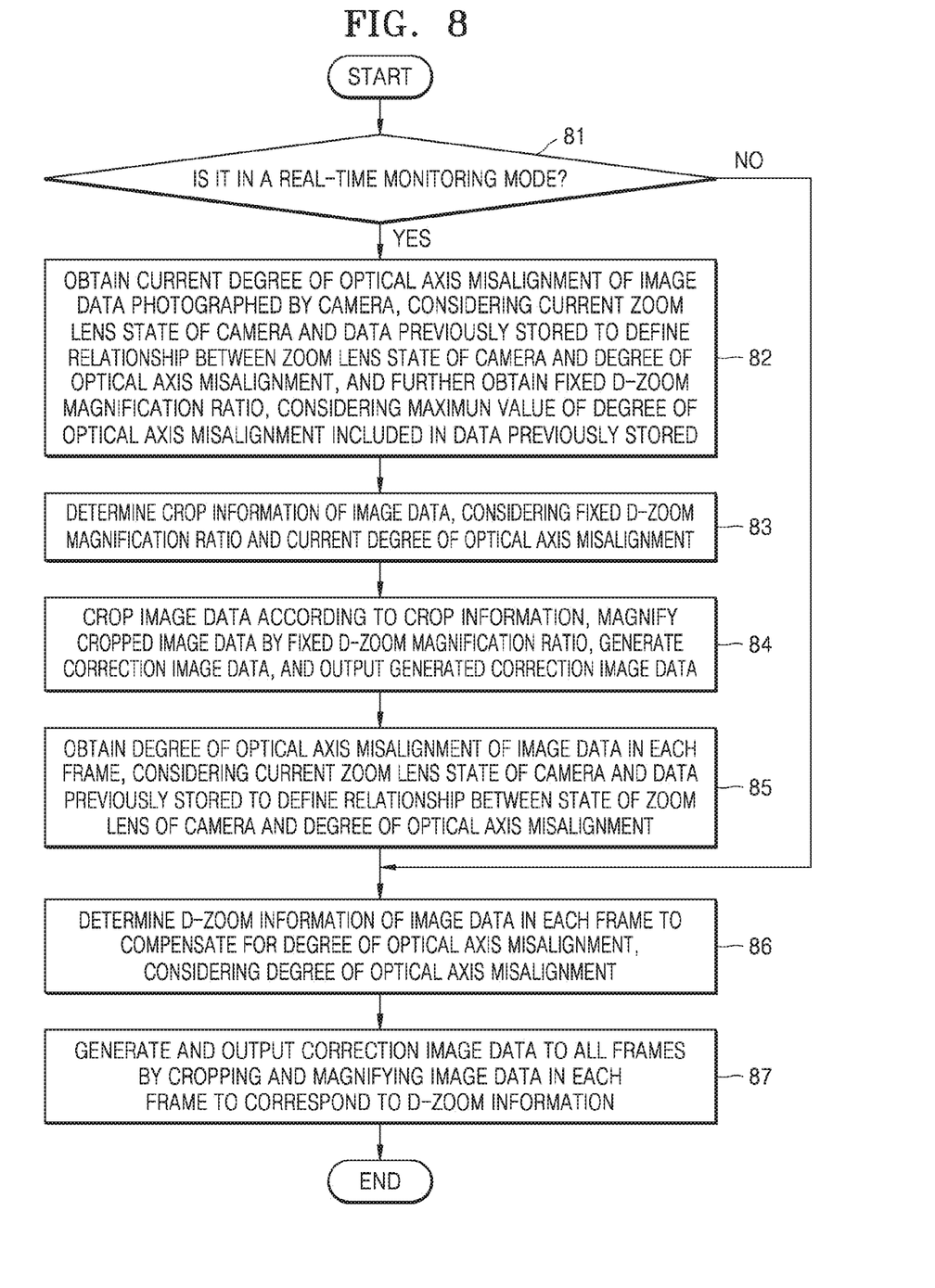
FIG. 8 is a flowchart of an optical axis correction method according to an embodiment of the disclosure.

FIG. 8 is a flowchart of an optical axis correction method according to an embodiment of the disclosure.

As the flowchart of FIG. 8 includes the camera system 10 of FIG. 1, in detail, time-serial operations performed by the control unit 120, in the following description, the embodiments of the disclosure are described with reference to FIGS. 1 and 8 together.

Referring to FIG. 8, the camera system 10 according to an embodiment may be driven in a real-time monitoring mode. The real-time monitoring mode may be a mode that is displayed on a display apparatus (not shown) in which an image captured by the camera 110 is displayed in real time. The display apparatus may be a separate apparatus that is connected to or disconnected from the camera 110 in a wired/wireless manner, and may be provided as one unit of the camera 110 that is always connected to the camera 110.

The camera system 10 according to an embodiment, which is in a real-time monitoring mode, may generate correction image data by using the fixed D-zoom magnification ratio according to the above-described second embodiment and output the generated correction image data to the display apparatus, and after the real-time monitoring mode is completed, may deliberately generate correction image data by using a variable D-zoom magnification ratio according to the first embodiment and output or store the generated correction image data.

The camera system 10, which is not in the real-time monitoring mode, may deliberately generate correction image data by using the variable D-zoom magnification ratio according to the first embodiment, and may output or store the generated correction image data.

For example, when the real-time monitoring mode is implemented by using a variable D-zoom magnification ratio that requires a large amount of a relative computational throughput, an operation speed per frame may not keep up with a display speed according to a frame rate, and thus overload is generated in displaying an image so that a smooth image display may not be possible. However, when the fixed D-zoom magnification ratio is used only for the real-time monitoring mode, the computational throughput is reduced so that the above problem may be addressed.

Referring to FIG. 8, in operation 81, the correction data generation unit 121 determines whether the camera system 10 is currently set in a real-time monitoring mode. The mode of the camera system 10 may be read out from the memory 123, but the disclosure is not limited thereto.

When the camera system 10 is currently in a real-time monitoring mode, operation 82 is performed, and otherwise, operation 86 is performed.

In operation 82, the correction data generation unit 121 may obtain a current degree of optical axis misalignment of image data photographed by the camera 110, considering data previously stored to define a relationship between the state of the zoom lens 112 of the camera 110 and a degree of optical axis misalignment and the current state of the zoom lens 112 of the camera 110, and further obtain a fixed D-zoom magnification ratio determined considering the maximum value of a degree of optical axis misalignment included in the previously stored data.

In operation 83, the correction data generation unit 121 may determine crop information of image data, considering the fixed D-zoom magnification ratio and a current degree of optical axis misalignment.

In operation 84, the image data output unit 122 may crop the image data according to the crop information, generate correction image data by magnifying the crop image by the fixed D-zoom magnification ratio, and output the generated correction image data to the display apparatus in real time.

Operation 82 to operation 84 may be repeatedly performed with respect to each frame in the real-time monitoring mode.

After operation 84, operation 85 to operation 87 may be performed for generation of image data for keeping.

In operation 85, the correction data generation unit 121 may obtain a degree of optical axis misalignment of image data in each frame, considering the data previously stored to define a relationship between the state of the zoom lens 112 of the camera 110 and a degree of optical axis misalignment, and the state the zoom lens 112 of the camera 110 in each frame.

In operation 86, the correction data generation unit 121 may determine D-zoom information in each frame to compensate for a degree of optical axis misalignment, considering a degree of optical axis misalignment.

In operation 87, the image data output unit 122 may crop and magnify image data of each frame to correspond to the D-zoom information, and generate and output correction image data with respect to all frames.

Operation 82 to operation 84 may correspond to the above-described second embodiment, and operation 85 to operation 87 may correspond to the above-described first embodiment, and regarding any description that is not given in relation to FIG. 8, the descriptions of the embodiments of the disclosure above may be applied to the flowchart of FIG. 8.

In the above-described embodiments of the disclosure, the control device 120 may perform optical axis correction only when a user directly manipulates the driving unit 113 to manually adjust optical zoom, and may not perform the optical axis correction when the camera 110 automatically operates the zoom lens 112 according to predetermined rules, for example, a preset operation or a group operation.

The methods according to the embodiments of the disclosure illustrated in FIGS. 2, 3, and 8 may be written as computer programs and may be implemented in general-use digital computers that execute the programs using a computer-readable recording medium. Examples of the computer-readable recording medium include magnetic storage media, e.g., ROM, floppy disks, hard disks, etc., optical recording media, e.g., CD-ROMs, or DVDs, etc.

While this disclosure has been particularly shown and described with reference to embodiments thereof, it will be understood by those skilled in the art that various changes in form and details may be made therein without departing from the spirit and scope of the disclosure as defined by the appended claims. The embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The disclosure may be applied to a camera system. For example, the disclosure may be applied to a camera system having a zoom lens. The disclosure may be applied to all fields in which still images and moving images are captured by using a camera having a zoom lens.

The one or more embodiments described above are intended to exemplify the main concepts of the disclosure, and not limit the disclosure. It will be understood by one of ordinary skill in the art that various substitutions, amendments, or modifications may be made to +the one or more embodiments of the disclosure without departing from the spirit and scope of the disclosure.

The invention claimed is:

1. A method of correcting an optical axis of a zoom lens, the method comprising:
    obtaining a degree of optical axis misalignment corresponding to a current zoom lens state of a camera, considering the current zoom lens state of the camera and data previously stored to define a relationship between a state of the zoom lens of the camera and the degree of optical axis misalignment;
    determining digital zoom information to compensate for the degree of optical axis misalignment, considering the degree of optical axis misalignment; and
    generating correction image data by cropping and magnifying image data photographed by the camera to correspond to the digital zoom information.

2. The method of claim 1, wherein the obtaining of the degree of optical axis misalignment comprises obtaining the degree of optical axis misalignment corresponding to the current zoom lens state by referring to the previously stored data,
    the digital zoom information comprises a digital zoom magnification ratio and crop information,
    the determining of the digital zoom information comprises determining the digital zoom magnification ratio and the crop information, considering the degree of optical axis misalignment, and
    the generating of the correction image data comprises generating the correction image data by zooming the image data by the digital zoom magnification ratio and cropping the image data to correspond to the crop information.

3. The method of claim 1, wherein the previously stored data comprises a look-up table including a plurality of indexes including a zoom lens state and a degree of optical axis misalignment matching the zoom lens state, and the determining of the digital zoom information comprises determining the digital zoom information on the basis of the degree of optical axis misalignment included in an index corresponding to the current zoom lens state of the indexes included in the look-up table.

4. The method of claim 3, wherein the determining of the digital zoom information comprises, when the look-up table does not include an index corresponding to the current zoom lens state, obtaining the degree of optical axis misalignment corresponding to the current zoom lens state on the basis of interpolation of data included in the indexes included in the look-up table.

5. The method of claim 1, wherein the determining of the digital zoom information comprises determining the digital zoom information further considering a resolution of a frame of the image data.

6. The method of claim 5, wherein the resolution comprises a first axis component and a second axis component that is different from the first axis component, the degree of optical axis misalignment comprises the first axis component and the second axis component, and the determining of the digital zoom information comprises determining the digital zoom information, considering the first axis component and the second axis component of the degree of optical axis misalignment and the first axis component and the second axis component of the resolution.

7. The method of claim 6, wherein the determining of the digital zoom information comprises determining the digital zoom information on the basis of a greater value between the degree of optical axis misalignment relative to the resolution with respect to the first axis and the degree of optical axis misalignment relative to the resolution with respect to the second axis.

8. The method of claim 7, wherein the digital zoom information comprises a digital zoom magnification ratio and crop information, and the determining of the digital zoom information comprises determining the digital zoom magnification ratio on the basis of the greater value and the crop information on the basis of the digital zoom magnification ratio and the degree of optical axis misalignment.

9. The method of claim 7, wherein the determining of the digital zoom information comprises determining the digital zoom information on the basis of a value calculated by using an Equation below, $$\text{Max}\left(\frac{R_1}{R_1 - |P_1| \times 2}, \frac{R_2}{R_2 - |P_2| \times 2}\right)$$

wherein "$R_1$" denotes a resolution of the first axis component, "$P_1$" denotes the degree of optical axis misalignment of the first axis component, "$R_2$" denotes a resolution of the second axis component, and "$P_2$" denotes the degree of optical axis misalignment of the second axis component.

10. The method of claim 1, wherein the digital zoom information comprises a digital zoom magnification ratio and crop information, the generating of the correction image data comprises generating the correction image data by cropping the image data according to the crop information and magnifying cropped image data by the digital zoom magnification ratio, and a frame size of the correction image data is the same as a frame size of the image data.

11. The method of claim 1, wherein the obtaining of the degree of optical axis misalignment comprises further obtaining a fixed digital zoom magnification ratio that is determined considering a maximum value of the degree of optical axis misalignment included in the previously stored data, the determining of the digital zoom information comprises determining crop information of the image data, considering the fixed digital zoom magnification ratio and the obtained degree of optical axis misalignment; and the generating of the correction image data comprises generating the correction image data by cropping the image data according to the crop information and magnifying cropped image data by the fixed digital zoom magnification ratio.

12. The method of claim 11, wherein the determining of the digital zoom information comprises determining the crop information further considering a size of a frame of the image data.

13. The method of claim 12, wherein the crop information comprises a location and a size of a crop area, and the determining of the digital zoom information comprises:

determining the location of the crop area considering the size of the frame, the fixed digital zoom magnification ratio, and the degree of optical axis misalignment; and determining the size of the crop area considering the size of the frame and the fixed digital zoom magnification ratio.

14. The method of claim 13, wherein the location of a crop area is represented by a crop start location including a first axis component that is determined from a value calculated by Equation 1 below and a second axis component that is determined from a value calculated by Equation 2 below, $$\frac{R_1\left(1 - \frac{1}{Z}\right)}{2} + P_1 \qquad \text{(Equation 1)}$$

$$\frac{R_2\left(1 - \frac{1}{Z}\right)}{2} + P_2 \qquad \text{(Equation 2)}$$

wherein "$R_1$" denotes the resolution of the first axis component, "$P_1$" denotes the degree of optical axis misalignment of the first axis component, "$R_2$" denotes the resolution of the second axis component, "$P_2$" denotes the degree of optical axis misalignment of the second axis component, and "$Z$" denotes the fixed digital zoom magnification ratio.

15. The method of claim 1, further comprising checking whether the camera is in a real-time monitoring mode, wherein, when the camera is in a real-time monitoring mode, the method further comprises correcting the image data photographed by the camera in real time according to a fixed digital zoom magnification ratio that is determined considering a maximum value of the degree of optical axis misalignment included in the previously stored data, and outputting the correction image data to a display apparatus in real time, and when the real-time monitoring mode is completed, the method further comprises generating the correction image data by cropping and magnifying the image data at each frame considering the degree of optical axis misalignment of the image data at each frame, by repeatedly performing the obtaining of the degree of optical axis misalignment, the determining of the digital zoom information, and the generating of the correction image data on each of a plurality of frames of the image data photographed by the camera.

16. A non-transitory computer readable storage medium for storing a computer program to perform the method of claim 1 by using a computer.

17. An apparatus for correcting an optical axis of a zoom lens, the apparatus comprising:
- a correction data generation unit configured to obtain a degree of optical axis misalignment corresponding to a current zoom lens state of a camera, considering the current zoom lens state of the camera and data previously stored to define a relationship between a state of the zoom lens of the camera and the degree of optical axis misalignment, and determine digital zoom information to compensate for the degree of optical axis misalignment, considering the degree of optical axis misalignment corresponding to a current zoom lens state of the camera; and
- an image data output unit configured to generate correction image data by cropping and magnifying image data photographed by the camera to correspond to the digital zoom information.

* * * * *